United States Patent [19]

Watkins

[11] 4,159,643
[45] Jul. 3, 1979

[54] METHOD OF AND APPARATUS FOR MEASURING BOTTOM HOLE WELL PRESSURE

[75] Inventor: Fred E. Watkins, Houston, Tex.
[73] Assignee: Camco, Incorporated, Houston, Tex.
[21] Appl. No.: 929,154
[22] Filed: Jul. 31, 1978
[51] Int. Cl.² ............................................. E21B 47/06
[52] U.S. Cl. ........................................ 73/155; 166/250
[58] Field of Search .................. 73/155, 151; 166/113, 166/133, 250, 332

[56] References Cited

U.S. PATENT DOCUMENTS

| | | | |
|---|---|---|---|
| 3,051,243 | 8/1962 | Grimmer et al. | 166/332 |
| 4,051,897 | 10/1977 | Kingelin | 166/125 |
| 4,083,401 | 4/1978 | Rankin | 166/250 |

*Primary Examiner*—Jerry W. Myracle
*Attorney, Agent, or Firm*—Fulbright & Jaworski

[57] ABSTRACT

A method of and apparatus for measuring bottom hole pressure in the tubing of a well by installing an isolation assembly in the tubing by a locking and sealing device in which the assembly includes first and second ports in communication between the interior of the assembly and the interior of the tubing. A sensor prong is releasably installed in the isolation assembly and includes a pressure measuring instrument releasably connected thereto. After the well is flowed through the first port, the first port is closed by actuation of the prong, and pressure measurements are taken through the second port by the pressure measuring instrument. After completion of the measurement, the measuring instrument may be released from the prong and retrieved. The prong is thereafter retrieved. The first port, which is larger than a second port, is initially releasably held open. The isolation assembly includes seals above and below the second port for sealingly engaging the prong and may be covered by a protective fluid for protecting the seals from the well fluid. The second port may include a check valve normally closed but opened by insertion of the prong.

12 Claims, 6 Drawing Figures

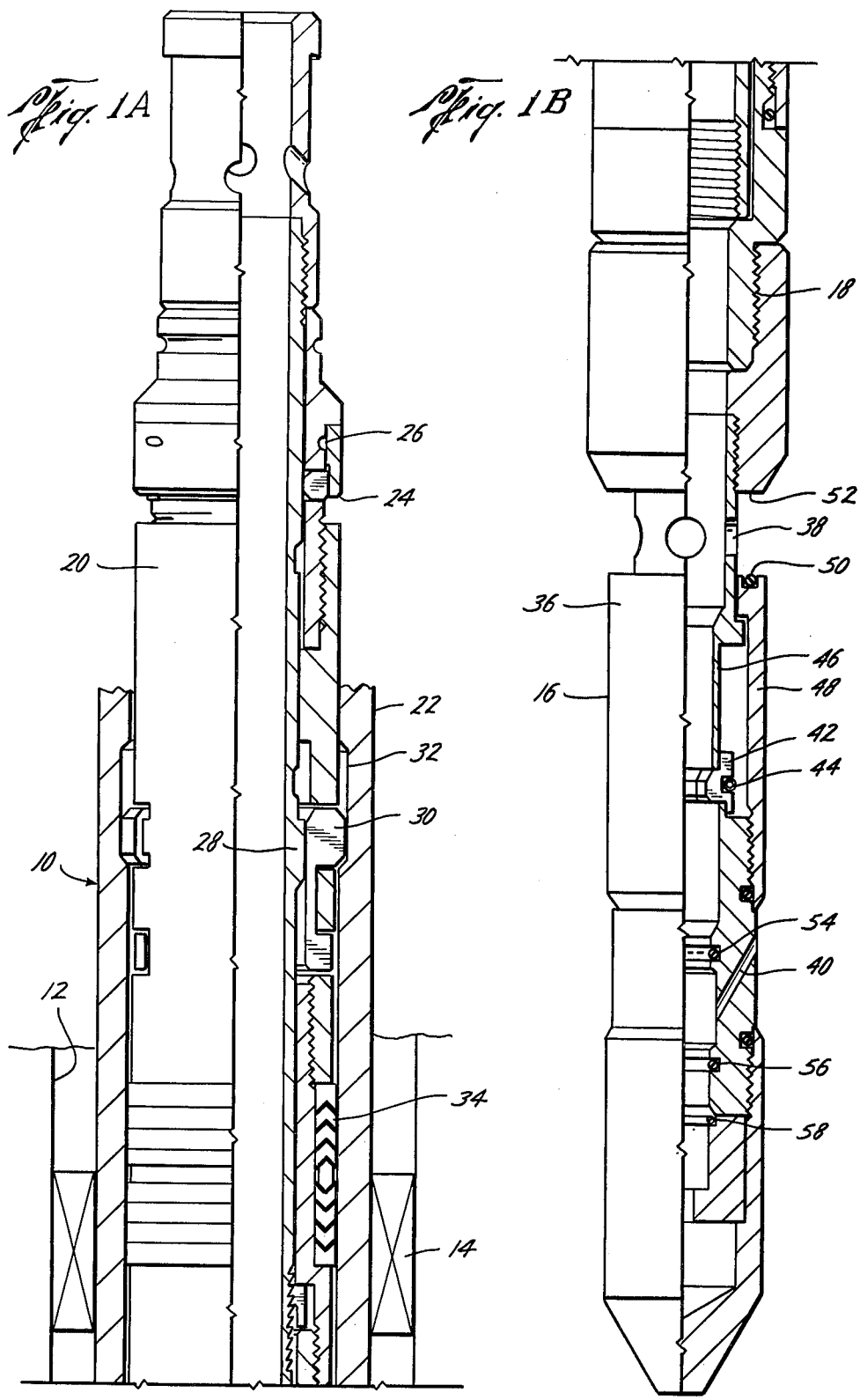

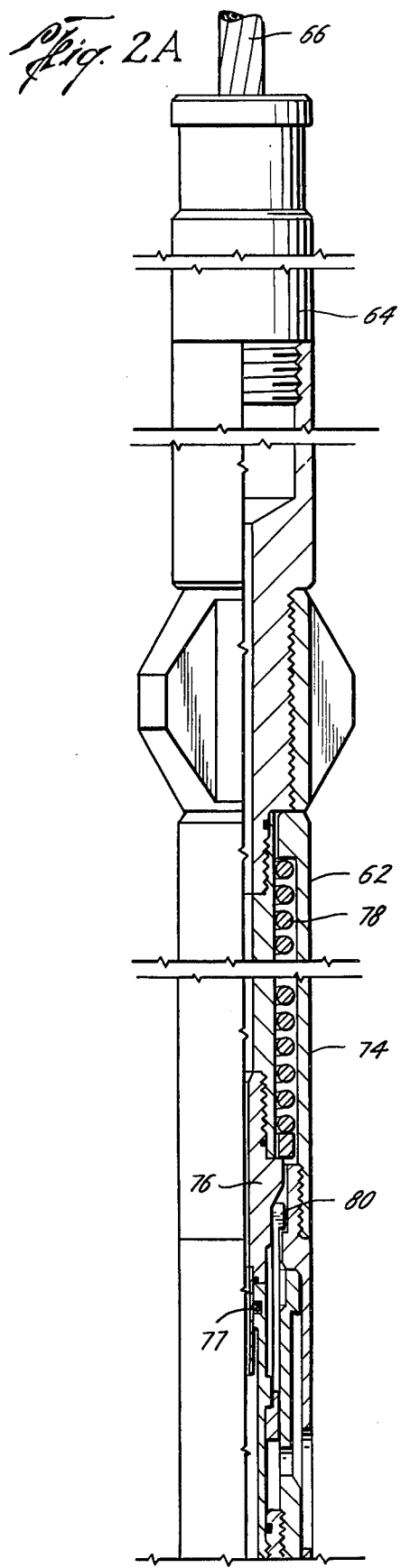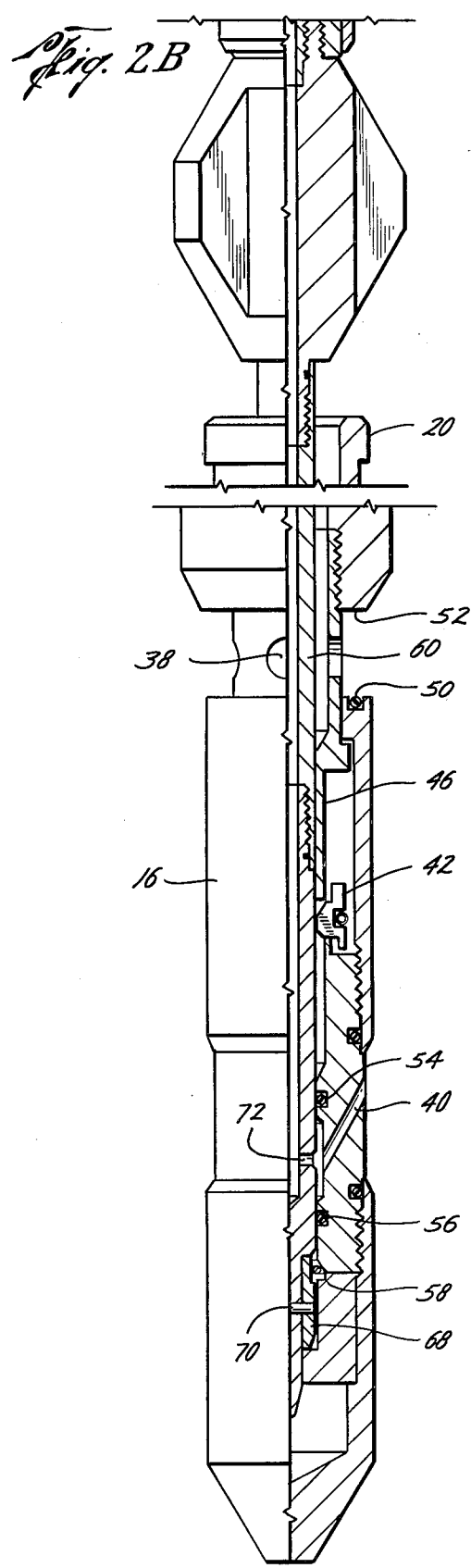

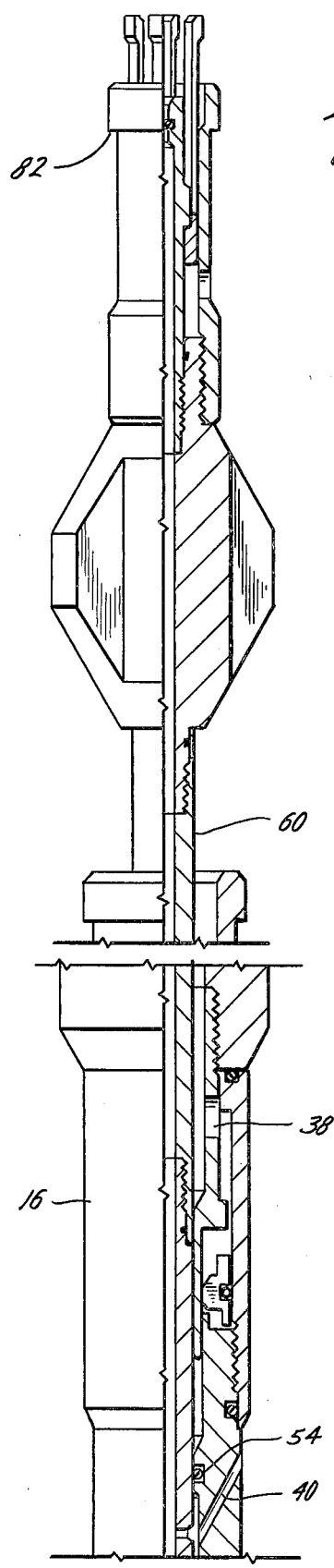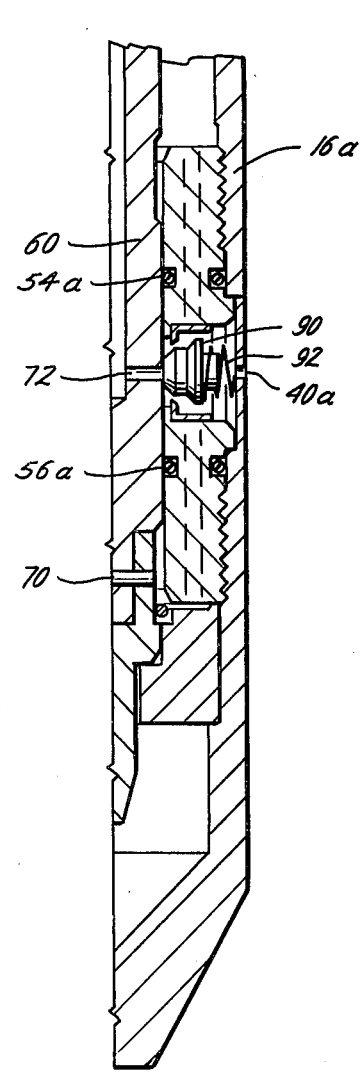

METHOD OF AND APPARATUS FOR MEASURING BOTTOM HOLE WELL PRESSURE

BACKGROUND OF THE INVENTION

Measurements of bottom hole pressure are important in obtaining (1) pressure buildup characteristics in obtaining oil and/or gas well producing information and (2) pressure falloff in injection wells. A typical procedure in producing wells involves flowing a well at a particular rate until the bottom hole pressure has stabilized and a pressure measuring instrument is set near the well bottom and production flow is stopped until the pressure reaches a reasonably close maximum value. It is desirable to obtain the pressure buildup by closing the tubing string near the well bottom and measuring the pressure buildup below this low closure point, as indicated in U.S. Pat. Nos. 4,051,897 and 4,083,401.

The present invention is directed to various improvements in the method and apparatus for measuring bottom hole pressure which performs the test quickly thereby reducing the considerable expense involved in normal testing because of lost production time and pressure measuring service charges. In addition, the measurement is made by avoiding the routine jarring of normal wireline tools as much as possible which is detrimental to the expensive and delicate subsurface pressure measuring instrument.

SUMMARY

The present invention is directed to a method of and apparatus for measuring bottom hole pressure in an oil and/or gas producing well or in an injection well by flowing the well prior to pressure measurement, closing the tubing near the well bottom and measuring the pressure change below the point of closure by a pressure measuring instrument positioned downhole. After completing the test, the pressure measuring instrument is retrieved.

Another object of the present invention is the provision of measuring bottom hole pressure by installing an isolation assembly in the well tubing by a locking and sealing device in which the assembly includes a first flow port and a second measuring port which are in communication between the interior of the assembly and the interior of the tubing. After allowing the well to flow through the first port, a sensor prong is releasably installed in the isolation assembly in which the prong has an opening which is positioned in communication with the second port. A pressure measuring instrument may be releasably connected to the sensor prong and in fluid communication with the prong opening for measuring pressure buildup through the second port. The first port is closed by actuation of the prong. After completion of the measurement, the measuring instrument may be released from the prong and retrieved from the well and the prong is thereafter retrieved.

Yet a further object of the present invention is the provision of an isolation assembly including a body having first and second ports communicating between the inside and outside of the body with the first flow ports being larger than the second measuring ports whereby the flow ports allow flowing the well to obtain the desired pressure drawdown or pressure buildup and the smaller measuring ports are adapted to communicate the shut-in pressure to a pressure measuring instrument and avoid damage to the measuring instrument when retrieved.

Still a further object of the present invention is the provision of seal means in the isolation assembly above and below the second ports for sealingly engaging with the prong in which the body includes a protective fluid covering and protecting the seals to prevent their swelling and causing greater forces than desired to insert the prong through the seals.

Yet a further object of the present invention is the provision of a check valve positioned in the second port for normally closing the port thereby protecting the seals about the port but which is actuated to an open position by insertion of the prong into the isolation assembly.

A still further object of the present invention is the provision of a sensor probe and measuring instrument which when inserted in the isolation assembly is pressure balanced.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIGS. 1A and 1B are continuations of each other and are fragmentary elevational views, partly in cross section, of an isolation assembly of the present invention installed in a well tubing by a suitable locking and sealing device, FIGS. 2A and 2B are continuations of each other of a fragmentary elevational view, partly in cross section, of a measuring apparatus releasably connected to a sensor prong which is inserted into the isolation assembly of FIG. 1B, FIG. 3 is a fragmentary elevational view, partly in cross section, illustrating the apparatus of the present invention after completion of a bottom hole pressure measuring test and removal of the pressure measuring instrument, and FIG. 4 is an enlarged fragmentary elevational view, in cross section, of another embodiment of the isolation assembly of the present invention.

DESCRIPTION OF THE PREFERRED EMBODIMENT

While the method and apparatus of the present invention is applicable to measuring the bottom hole buildup pressure of a producing oil and/or gas well as well as the bottom hole fallover pressure of an injection well, the invention will be described in connection with measuring the bottom hole pressure in a producing well.

Referring now to FIGS. 1A and 1B, a typical well installation is illustrated having production tubing, generally indicated by the reference numeral 10, positioned in a well bore 12 with a packer 14 therebetween whereby production well fluids flow upwardly through the tubing 10 to the well surface.

An isolation assembly, generally indicated by the reference numeral 16, is shown connected, such as by threads 18, to any suitable type of locking and sealing device, generally indicated by the reference numeral 20, such as a Camco CS lock, which is locked into the tubing 10 such as in a conventional landing nipple 22 such as Camco type DS. As is conventional, the lock 20 has a "no go" ring 24 which contacts a shoulder (not shown) in the landing sub 22 and downward jarring shears shear pins 26 whereby the expander tube 28 drives the locking dogs 30 into a recess 32 in the landing nipple 22 for holding the isolation assembly 16 in the desired position and a seal 34 seals off the annulus between the exterior of the lock 20 and the interior of the landing nipple 22.

The isolation assembly 16 includes a body 36 and a set of first flow ports 38, and a set of second measuring ports 40. The ports 38 and 40 communicate between the interior of the body 36 and the exterior of the body 36 for allowing communication of well fluids from the well tubing 10 into the interior of the body 16. The larger first ports 38 allow flowing the well from the bottom upwardly to the well surface to obtain the desired pressure drawdown (or in the case of injection wells of flowing fluid downwardly). When the isolation assembly 16 is installed initially, as shown, the first ports 38 are releasably held in the open position by a plurality of expansion dogs 42 yieldably urged inwardly by a garter spring 44 to hold telescoping portions 46 and 48 of the body 16 in an extended position with the ports 38 open. When the portion 48 is moved upwardly relative to the portion 46, after disengagement of the dogs 42, a seal 50 will mate against a seat 52 to close the first flow ports 38.

Seals 54 and 56 are provided above and below the lower second measuring ports 40 for coacting with a sensor probe, as will be more fully described hereinafter. However, the seals 54 and 56 are preferably "O" rings, generally of the elastomeric type. Seals 54 and 56 are subject to swelling when in contact with particular fluids and temperatures such as well fluids and additionally swell from expansion of gas as the pressure is lowered during the producing phase of the testing procedures. Swelling of the seals 54 and 56 could cause significantly greater forces to be required to insert a sensor prong through the seals 54 and 56 thereby require jarring of the prong which is undesirable as the prong is attached to a sensitive measuring instrument. Therefore, it may be desirable to initially fill the lower cavity of the body 16 with a suitable protective fluid, such as a silicone type, above the level of the seals 54 and 56 for keeping swell inducing fluids and gases from contacting the seals 54 and 56. Preferably the top of ports 40 extend above seal 54 to insure immersion of the seals 54 and 56 in a protective fluid. In addition, the isolation assembly 16 includes a suitable coacting locking means such as a C-ring 58 for coacting and locking with the sensor prong as will be more fully discussed hereinafter.

Referring now to FIGS. 2A and 2B, a sensor prong 60 has been inserted into the isolation assembly 16, preferably by means of a disconnect tool generally indicated by the reference numeral 62 and any suitable pressure measuring instrument 64, such as Hewlett Packard Model 2813-B Quartz Pressure Probe, all of which are lowered into the well tubing on any suitable means such as a wireline 66. The sensor prong 60 is releasably locked to the isolation assembly 16 by the C-ring 58 which engages a shoulder on part 68 which in turn is connected to the prong by a shear pin 70. As the prong 60 is inserted into the assembly 16, the prong 60 contacts the expansion dogs 42, moving them out of locking engagement with portion 46 whereby upward movement of the prong 60 by means of the wireline 66 will now move the seal 50 onto its seat 52 closing the first ports 38.

The prong 60 also includes an opening 72 which communicates between the interior and the exterior of the prong 60 and which is positioned adjacent the second ports 40 when the prong 60 is installed in the assembly 16. With the closure of the first ports 38, bottom hole well pressure will build up and flow through the second ports 40, through the opening 72 in the sensor prong 60, up through the disconnect tool 62 and to the pressure measuring instrument 64. The instrument 64 measures the bottom hole pressure and preferably transmits its measured information through a conductor in the wireline cable 66 to the well surface. However, as previously mentioned, the measuring instrument 64 is a somewhat delicate and expensive instrument which cannot be subjected to the usual jarring that most subsurface well equipment encounters.

After the measuring instrument 64 has completed the measurement of the bottom hole test, the instrument 64 may be removably disconnected from the sensor prong 60 and retrieved from the well without jarring. The disconnect tool 62 includes a housing 74 and a spring mandrel 76 with a spring 78 therebetween. The top of the sensor prong 60 may include a plurality of collets 80 which are normally releasably secured between the housing 74 and spring mandrel 76 of the disconnect tool 62. However, upon a sufficient upward pull of the wireline cable 66, the spring mandrel 76 will overcome the spring 78 and move from behind the sensor prong collets 80 thereby disconnecting from the sensor prong 60 and allowing the retrieval of the measuring instrument 65 and disconnect tool 62. The sensor prong 60 may be later retrieved by latching the fishing neck 82 with a conventional wireline pulling tool and by upward jarring, to which the instrument 64 is not subjected, the shear pins 70 are sheared allowing removal of the sensor prong except for the part 68 trapped by the C-ring 58 which stays in and is removed with the lock 20 and isolation assembly 16 using standard wireline tools and practice.

Preferably, the combination of the measuring instrument 64, disconnect 62, and probe 60 is pressure balanced on either side of the seals 54 and 56 and the locking of the probe 60 into the isolation assembly 16 is not needed for holding the probe 60 in the assembly 16 but is needed for the purpose of closing ports 38. Therefore, the shear pin 70 may be of a minimum strength and, if desired, the disconnect 62 may be omitted and the measuring instrument may be fixedly connected to the probe 60 and both the measuring instrument 64 and probe 60 may be simultaneously retrieved after testing.

It is noted that the first flow ports 38 are larger than the measuring ports 40. The ports 40 could be made large enough to handle the fluid flow during pressure drawdown, thereby eliminating the ports 38. However, if when retrieving the pressure measuring instrument 64, the shear pin 70 was inadvertently sheared and the sensor prong 60 removed or if the prong 60 was removed with the instrument 64, any large ports would result in high fluid flow which would blow the measuring instrument 64 up the well tubing, tangling the wireline conductor 66 and causing damage to the measuring instrument 64. Therefore, the use of separate and different sized flow ports 38 and measuring ports 40 allow the use of large ports to flow the well fast enough to obtain the desired pressure drawdown while the small ports are sufficient to communicate the shut-in pressure to the measuring instrument 64 without exposing the instrument 64 to high flows.

Referring now to FIG. 4, a further embodiment of the isolation tool is illustrated wherein like parts to those shown in FIGS. 1A–3 include the suffix "a". The isolation tool 16a shown in FIG. 4 is generally the same as previously described with the addition of a check valve 90 positioned in each of the second ports 40a which is yieldably urged to the closed position by a spring 92. One purpose of the check valve 90 is to close the ports 40a allowing the interior of the isolation tool 16a to be filled with a protective fluid for protecting the seals 54a and 56a. The check valve 90 is moved to the open position, as shown, by the insertion of the sensor prong 60 which places the sensor prong opening 72 in communication with the measuring ports 40a. Another function of the check valve 90 is to close the ports 40a in the event that the prong 60 is removed upon removing the measuring instrument 64 after the pressure measurement has been performed.

In use, the lock and seal device 20, with the attached isolation assembly 16, is installed in the landing nipple 22 and locked therein by conventional wireline means. The large flow ports 38 allow flowing the well to obtain the desired drawdown. As the flow rate reaches a rate with velocities that will allow doing so, the measuring instrument 64 and attached sensor prong are lowered through the tubing string 10 or the well may be flowed to obtain drawdown while the pressure instrument 64 and prong 60 are positioned in the tubing 10 but above the device 20. After the desired drawdown is obtained, the measuring instrument 64 and prong 60 are lowered and installed in the well by lowering the wireline 66 until the sensor prong 60 moves into locking engagement, as best seen in FIG. 2B, as the C-ring 58 engages and locks on the part 68 of the sensor prong 60. Although the low flow in most instances would allow stabbing the sensor prong 60 through the seals 54 and 56 and into locking engagement, a valve at the surface (not shown) could be closed thereby reducing fluid flow before stabbing the sensor 60 into position. The sensor prong 60, when installed in the isolation assembly 16, also engages and expands the dogs 42 outwardly, and the prong 60 is raised by the wireline 66 to move the outer portion 48 of the isolation assembly 16 upwardly, to seat the seal 50 on its seat 52 thereby closing the flow ports 38. At this time, pressure will begin to build up and will flow through the measuring ports 40, the opening 72, through the prong 60, through the disconnect tool 62 and to the pressure measuring instrument 64 for measuring the pressure buildup. The measured results of the pressure measuring instrument 64 may be recorded or may preferably be transmitted uphole through an electrical line in the wireline 66.

At the completion of the test, an upward pull on the wireline 66 allows the mandrel 76 to move upwardly against the spring 78 and out from behind the collets 80 releasing the pressure instrument 64 and disconnect tool 62 from the sensor prong 60. The pressure instrument 64 is then retrieved from the well tubing 10. Removal of the disconnect tool from the seal 77 allows controlled equalization of pressure through the ports 40 as the instrument 64 is returned to the surface.

The sensor prong 60 is then retrieved by latching the fishing neck 82 with a conventional wireline pulling tool. An upper jarring shears the shear pin 70 allowing the removal of the sensor prong 60 with the exception that the part 68, which is trapped by the C-ring 58, remains in the isolation assembly 16. The lock and sealing device 20 and isolation assembly 16 may then be removed using standard wireline tools.

Alternatively, as mentioned, the disconnect 62 may be omitted and the instrument 64 fixedly connected to the probe 60 and both are simultaneously retrieved after testing by shearing pin 70.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts, and steps of the process, will readily suggest themselves to those skilled in the art and which are encompassed within the spirit of the invention and the scope of the appended claims.

What is claimed is:

1. A method of measuring bottom hole pressure in the tubing of a well comprising
    install an isolation assembly in the tubing by a locking seal device, said assembly including first and second ports in communication between the interior of the assembly and the interior of the tubing, said first port being open for flowing through the first port,
    releasably install a sensor prong in the isolation assembly including a pressure measuring instrument which is connected to the prong,
    close the first port in the assembly by actuation of the prong,
    measuring through the second port the pressure below the assembly by the pressure measuring instrument,
    after completion of the measurement, retrieve the measuring instrument.

2. The method of claim 1 wherein prior to the step of installing the sensor prong, the first port is releasably held open.

3. The method of claim 1 wherein prior to the step of installing the sensor prong, the first port, which is larger than the second port, is releasably held open.

4. The method of claim 1 wherein the measuring instrument is releasably connected to the probe, and
    after completion of the measurement, the measuring instrument is released from the probe and retrieved and
    thereafter, the prong is retrieved.

5. A method of measuring bottom hole pressure in the tubing of a well comprising,
    install an isolation assembly in the tubing fixed to a locking seal device which device engages the tubing, said assembly including first and second ports, said ports being in communication between the interior of the assembly and the interior of the tubing, said first port being larger than said second port and being releasably held open for allowing flowing the well,
    releasably install a sensor prong having an opening into the isolation assembly with the opening positioned in communication with said second port and including a pressure measuring instrument which is releasably connected to the prong and in fluid communication with the opening,
    close the first port by actuation of the prong,
    measure through the second port and the opening the pressure below the assembly by the pressure measuring instrument,
    after completion of the measurement, release the measuring instrument from the prong and retrieve the measuring instrument, and
    thereafter, retrieve the prong.

6. An apparatus for measuring bottom hole pressure in the tubing of a well comprising, locking and sealing means adapted to lock into and seal against the interior of the well tubing, an isolation assembly connected to the locking and sealing means, said assembly including a body having first and second ports communicating between the inside and the outside of said body, said first port being larger than the second port, and including means releasably holding the first port in the open position, a sensor prong adapted to be releasably installed in the body, said prong including an inside cavity and opening for communicating between the second port and the cavity, a pressure measuring instrument connected to the sensor prong and in fluid communication with the prong cavity for measuring fluid pressure in the tubing.

7. The apparatus of claim 6 wherein the measuring instrument is releasably connected to the sensor probe.

8. The apparatus of claim 6 wherein the measuring instrument and probe are pressure balanced on both sides of the second ports.

9. The apparatus of claim 6 wherein the isolation assembly includes seal means above and below the second port for sealably engaging with the prong, and the first port is positioned above the second port, and the body includes a protective fluid in said cavity covering and protecting the seal means.

10. The apparatus of claim 6 wherein the isolation assembly includes, seal means above and below the second port for sealably engaging with the prong, said second port includes a check valve normally closing said port but opened by insertion of the prong.

11. The apparatus of claim 10 wherein the first port is positioned above the second port and the cavity in the isolation assembly is filled with a protective fluid to a point above the seal means for protecting the seal means from the well fluid.

12. The apparatus of claim 6 wherein the prong includes means for engaging and releasing the releasing holding means in the isolation assembly holding the first port in the open position.

* * * * *